United States Patent
Buck et al.

(10) Patent No.: US 6,930,431 B2
(45) Date of Patent: Aug. 16, 2005

(54) ELECTRIC MACHINE AND MANUAL MACHINE TOOL COMPRISING THE SAME

(75) Inventors: Manfred Buck, Nuertingen (DE); Otto Baumann, Leinfelden-Echterdingen (DE); Siegfried Fehrle, Leinfelden-Echterdingen (DE); Dietmar Saur, Gomaringen (DE); Andre Ullrich, Filderstadt-Bernhausen (DE); Michael Weiss, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 10/450,209

(22) PCT Filed: Jul. 20, 2002

(86) PCT No.: PCT/DE02/02680

§ 371 (c)(1),
(2), (4) Date: Jun. 11, 2003

(87) PCT Pub. No.: WO03/038974

PCT Pub. Date: May 8, 2003

(65) Prior Publication Data

US 2004/0084991 A1 May 6, 2004

(30) Foreign Application Priority Data

Oct. 26, 2001 (DE) .......................................... 101 52 963

(51) Int. Cl.[7] .......................... H02K 5/14; H02K 13/00; H02K 23/18; H01R 39/44
(52) U.S. Cl. ........................ 310/239; 310/50; 310/68 A
(58) Field of Search ................................. 310/50, 68 A, 310/238, 239, 241; 318/541

(56) References Cited

U.S. PATENT DOCUMENTS

| | | | | |
|---|---|---|---|---|
| 3,440,465 A | * | 4/1969 | Pratt et al. ................... | 310/230 |
| 4,342,931 A | * | 8/1982 | Grossmann et al. .......... | 310/50 |
| 4,978,877 A | * | 12/1990 | Quirijnen .................... | 310/239 |
| 5,089,729 A | * | 2/1992 | Moores, Jr. .................. | 310/50 |
| 5,138,243 A | | 8/1992 | Binder | |

FOREIGN PATENT DOCUMENTS

| | | |
|---|---|---|
| DE | 37 31 079 A | 3/1989 |
| EP | 0 329 249 A | 8/1989 |
| EP | 0 924 842 A | 6/1999 |

* cited by examiner

Primary Examiner—Thanh Lam
Assistant Examiner—David W. Scheuermann
(74) Attorney, Agent, or Firm—Michael J. Striker

(57) ABSTRACT

The invention is based on an electrical machine with a rotatable brush plate (10, 12), which is held in its end positions by means of at least one holding mechanism (16, 18) that acts in the circumference direction (14).

The invention proposes that the holding mechanism (16, 18) have at least one device (20, 22) that loads the brush plate (10, 12) in the circumference direction (14).

11 Claims, 6 Drawing Sheets

ELECTRIC MACHINE AND MANUAL MACHINE TOOL COMPRISING THE SAME

BACKGROUND OF THE INVENTION

The invention is based on an electrical machine.

In electrical machines with a brush plate that can be rotated on a housing base of a housing part, it is known to hold this brush plate in its end positions by means of a holding mechanism that acts in the circumference direction. The holding mechanism has hooks formed onto the brush plate, which engage the housing base from behind and which are moved in the circumference direction along a radially outward pointing end of the housing base when the brush plate is rotated. The end has projections pointing radially outward that are formed onto the housing base, spaced apart from end stops in the circumference direction. The distances between the end stops and the corresponding projections are selected so that they correspond to one hook width. When the brush plate is rotated, the hook moves across the projection extending in the radial direction, and arrives in an end position between the corresponding end stop and the respective projection. The end stop and the radial projection secure the brush plate in the circumference direction.

SUMMARY OF THE INVENTION

The invention is based on an electric machine with a rotatable brush plate that is held in its end positions by means of at least one holding mechanism that acts in the circumference direction.

The invention proposes that the holding mechanism have at least one device that loads the brush plate in the circumference direction. The brush plate can advantageously be held in a constant, play-free manner in its respective end position counter to a rotation direction, and a wear on the holding mechanism, in particular by outwardly pointing radial projections, can be advantageously avoided. A contact between a strip conductor affixed to the housing and a carbon cartridge mounted onto the brush plate can always be assured in the end positions, which makes it possible to prevent contacts from being burned off and to prevent a burn off-induced failure of the electrical machine.

The device advantageously has a bistable position, at least when in the installed position. Two forces in opposite directions can be generated in a structurally simple fashion with a single device or with a small number of components. It is also possible to achieve a design in which the device always moves the brush plate from an intermediate region into one of its end positions.

The device can be comprised of various components deemed appropriate by one skilled in the art, which have a bistable position either intrinsically or as a result of their installation, for example a relay, a spring element, etc. If the device is comprised of a spring element, then this permits a structurally simple, durable, reasonably priced, and space-saving device to be produced.

The spring element can be comprised of various spring elements deemed appropriate by one skilled in the art, e.g. a disk spring, a leg spring, etc. If the spring element is comprised of a leg spring, then an inexpensive, space-saving spring can be used, whose legs can advantageously be guided into the corresponding recesses disposed in the brush plate and in a housing part. The leg spring can be supported with its first leg against the housing part and its second leg can exert a spring force on the brush plate in the direction of its end positions.

In another embodiment, the invention proposes that the leg spring be supported so that it can pivot around the first leg. A bistable position of the leg spring can be achieved in a structurally simple manner and a simple and rapidly mountable holding mechanism can be achieved.

The invention also proposes the possibility of the leg spring engaging in detent fashion with the brush plate by means of a detent element. The leg spring can advantageously be preinstalled onto the brush plate and secured to it in captive fashion. The brush plate and the leg spring can be simply installed and removed as a unit.

If the detent element is of one piece with the leg spring, then this permits savings with regard to additional components, space, and costs.

At least one leg of the leg spring advantageously has a part for preventing an incorrect installation. The part can be comprised of a separate component or can be formed onto one end of the leg and be of one piece with it. If the part is formed onto the end of the leg of the leg spring-by means of a bending procedure, then a structurally simple, inexpensive protection against incorrect installation can be achieved.

In another embodiment, the invention proposes that an actuating button be embodied of one piece with the brush plate. This permits savings with regard to additional components, space, weight, and assembly costs. It is also possible for an advantageous installation space for the device to be created, particularly in the vicinity of the actuating button.

The invention also proposes that the brush plate be held in its end positions by means of at least one detent mechanism. The action of the device can be assisted and an operator can be clearly notified that the respective end position has been reached by means of a detent engagement.

Other advantages ensue from the following description of the drawings. The drawings depict exemplary embodiments of the invention. The drawings, the specification, and the claims contain numerous features in combination. One skilled in the art will suitably also consider the features individually and will unite them in other meaningful combinations.

DESCRIPTION OF THE PREFERRED EMBODIMENTS

Figure 1:
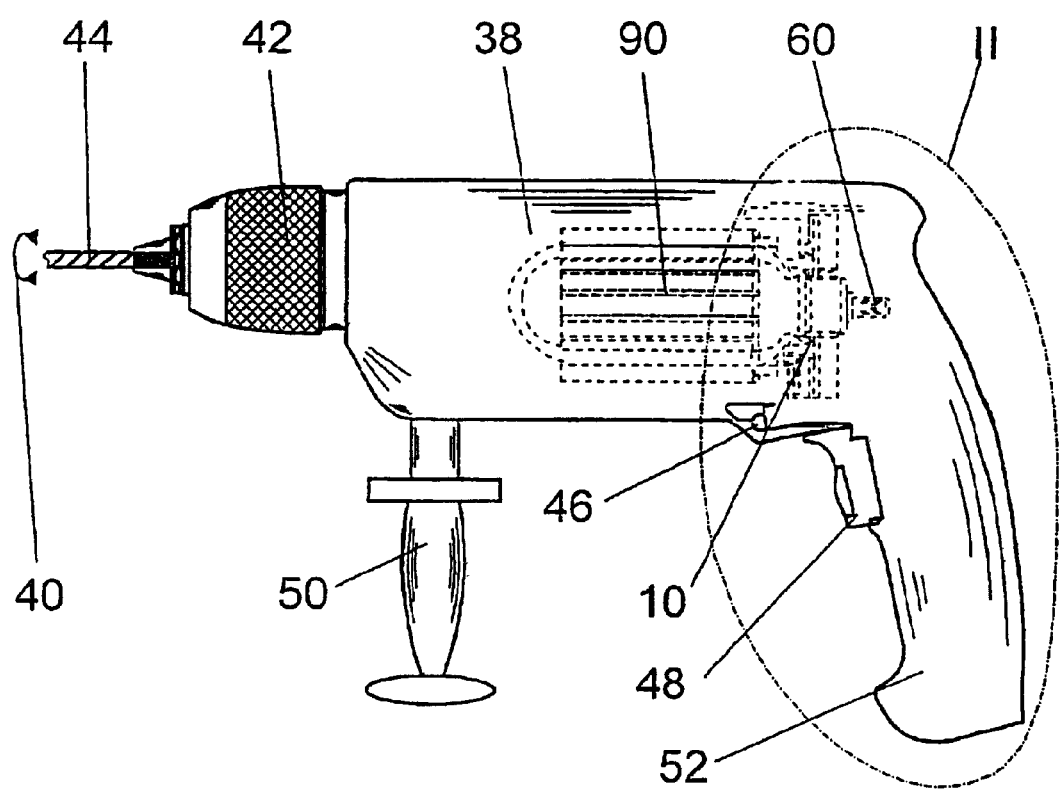
FIG. 1 shows a schematically depicted side view of a drill.

FIG. 1 shows a drill with a housing 38 that has an electric motor mounted in it, whose rotation direction 40, or the rotation direction 40 of a drill bit 44 clamped in a tool holder 42, can be selected by means of a reversing lever 46. The reversing lever 46 is disposed above an actuating switch 48 of the drill so that with one hand, an operator can operate the actuating switch 48, switch the drill on or off, and select the desired rotation direction 40 of the drill bit 44 by using the reversing lever 46. On a side of the drill oriented toward the tool holder 42, a first handle 50 extending perpendicular to the actuation direction is fastened to the housing 38. On a side of the housing 38 oriented away from the tool holder 42, a second handle 52 extending perpendicular to the actuating direction is provided, which constitutes a part of the housing 38.

The reversing lever 46 has an engaging fork 54, whose free end positively engages with an articulating pin 56 (FIGS. 2, 3, 4, and 5). The articulating pin 56 is formed onto a brush plate 10 in a lower region close to the reversing lever 46. The brush plate 10, which is supported in rotary fashion on a housing base 58, radially encloses an armature shaft 60. The brush plate 10 is secured in the axial direction by means of stays 88, which extend in the axial direction toward the tool holder 42 on a side of the brush plate 10 oriented away from the armature winding 90 and are formed onto an inside of the handle 52.

Figure 2:
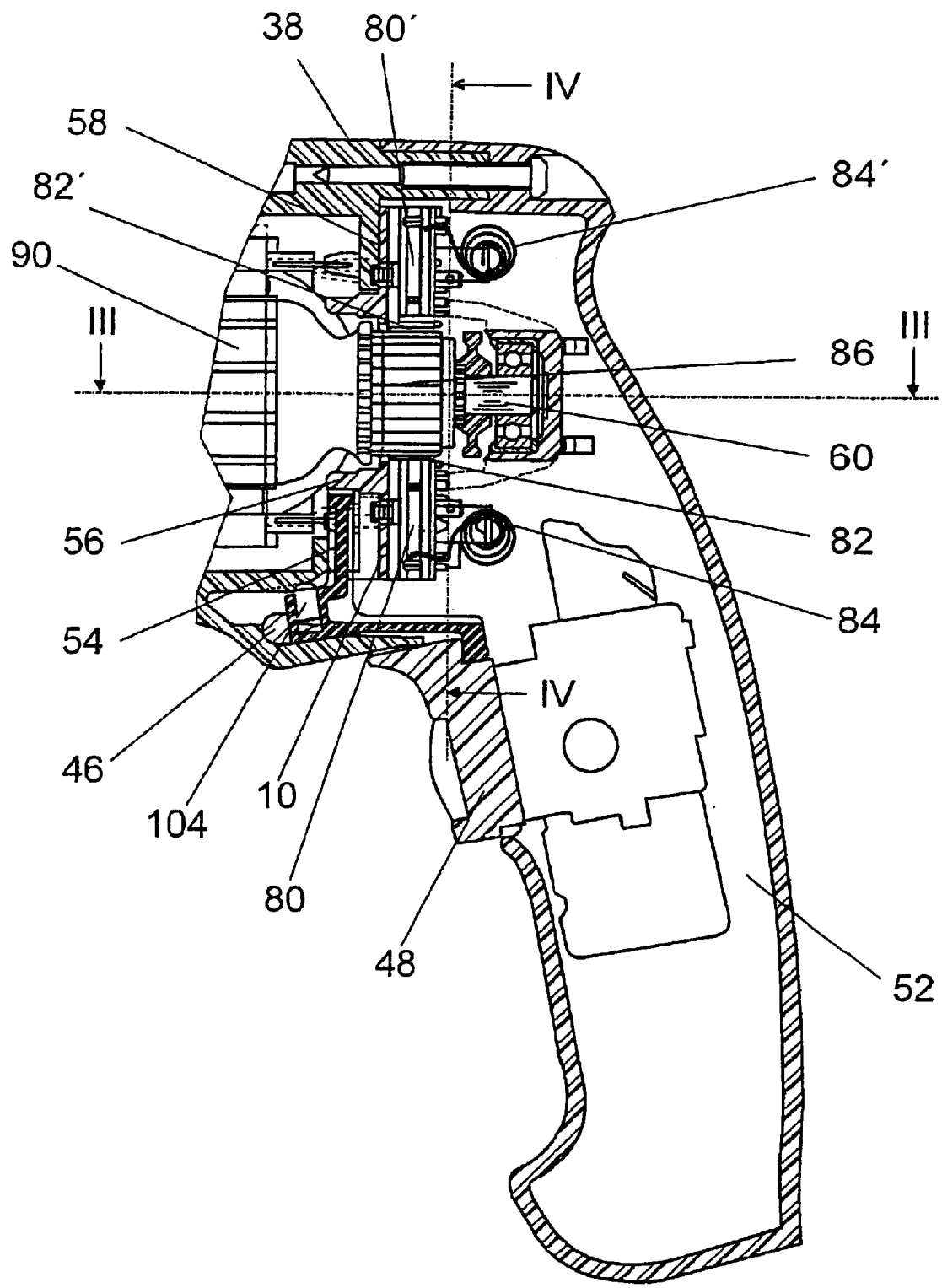
FIG. 2 shows a longitudinal section through a detail 11 in FIG. 1.
Figure 4:
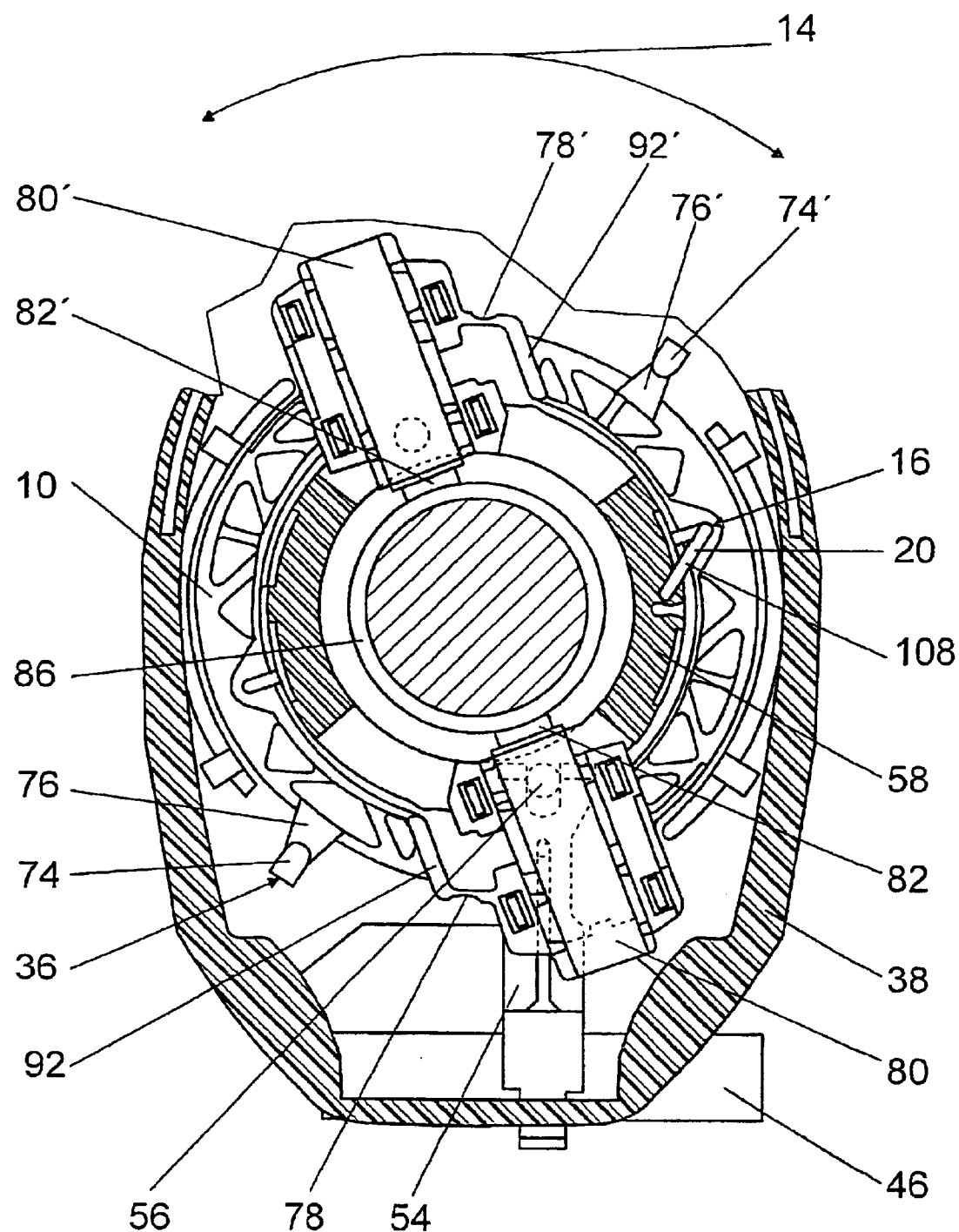
FIG. 4 shows a section along the line IV—IV in FIG. 2, in a first end position.
Figure 5:
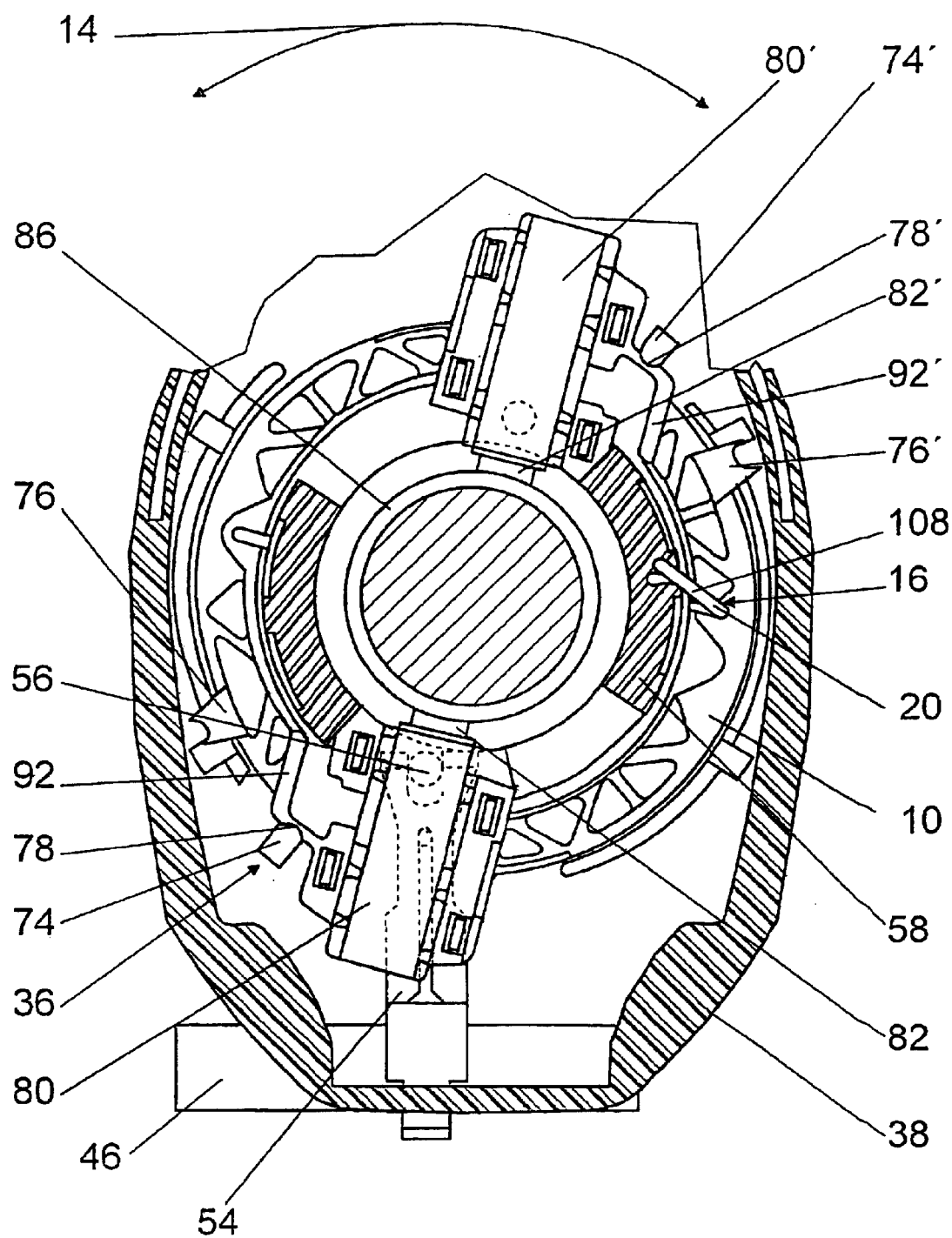
FIG. 5 shows a section along the line IV—IV in FIG. 2, in a second end position.

Carbon cartridges 80, 80' are disposed situated diagonally opposite from each other on the brush plate 10 (FIGS. 4 and 5). The carbon cartridges 80, 80' have recesses, not shown, for containing carbon brushes 82, 82'. Spring elements 84, 84' press the carbon brushes 82, 82' radially inward against a commutator 86 (FIG. 2).

Figure 3:
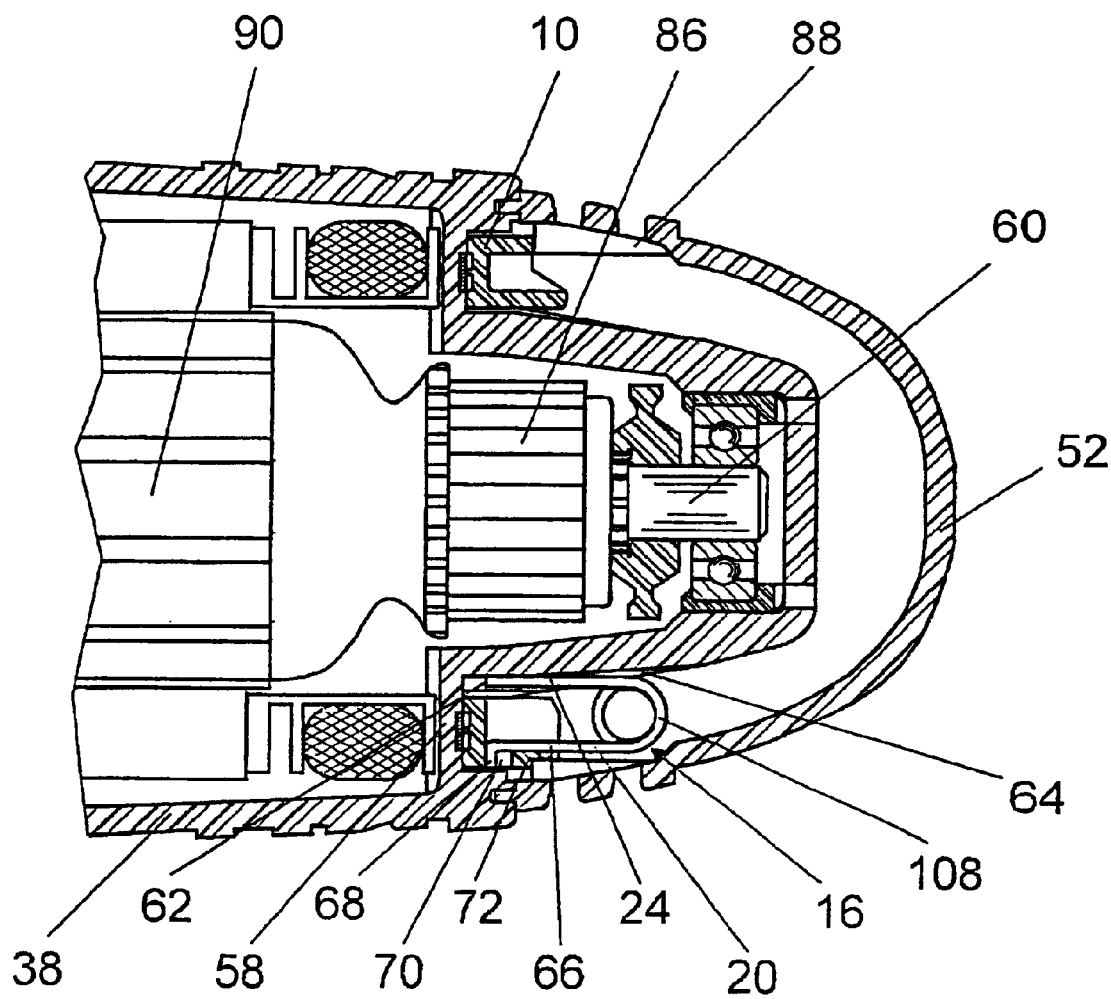
FIG. 3 shows a section along the line III—III in FIG. 2.

A holding mechanism 16 that acts in the circumference direction 14 holds the brush plate 10 in its end positions (FIGS. 3, 4, and 5). The holding mechanism 16 has a device 20 comprised of a leg spring that has a bistable position and that loads the brush plate 10 from a neutral, unstable, middle position, in the circumference direction 14 toward its respective end positions. The leg spring 20 has a first leg 24 and a second leg 66, which are connected to each other by a coil 108 of the leg spring 20.

The leg spring 20 is supported so that it can pivot around the longitudinal axis of the first leg 24 (FIG. 3). The first leg 24, whose end 62 points toward the tool holder 42, engages in a longitudinal channel 64 that is formed into an outer circumference of a cup-shaped inner region of the housing 38 that is encompassed by the handle 52. The armature shaft 60 of the electric motor is supported in the cup-shaped region of the housing 38.

The second leg 66 of the leg spring 20, which also points toward the tool holder 42, has a region that is bent radially outward at its end 68. With the bent region, the second leg 66 positively engages in a transverse channel 70 that is formed into a collar 72 on the radial outside of the brush plate 10.

The leg spring 20 is supported with its first leg 24 in the longitudinal channel 64 on the housing 38 and with its second leg 66, by means of the transverse channel 70, presses the brush plate 10 in the circumference direction 14, into its first end position (FIG. 4). In the first end position, the brush plate 10 is also secured in the circumference direction by a detent mechanism 36.

The detent mechanism 36 has two detent bolts 74, 74' formed onto the housing 38 that are disposed diagonally opposite each other (FIG. 4). In the first end position of the brush plate 10, the detent bolts 74, 74' positively engage in detent recesses 76, 76' that are let into outwardly protruding projections that are formed onto the brush plate 10.

If an operator actuates the reversing lever 46, the brush plate 10 is rotated in the circumference direction 14 by means of the engaging fork 54 and the articulating pin 56, and the detent bolts 74, 74' and the detent recesses 76, 76' disengage from one another. The leg spring 20 is compressed by means of its legs 24, 66 until the neutral position is reached. After the neutral position is passed, the leg spring 20 expands and with its second leg 66, presses the brush plate 10 in the circumference direction 14, into its second end position and is supported with its first leg 24 in the longitudinal channel 64 of the housing 38. When the second end position is reached, the detent bolts 74, 74' engage with two other detent recesses 78, 78' let into the frames 92, 92' of the carbon cartridges 80, 80'. In addition to the leg spring 20, the brush plate 10 is also secured in the circumference direction in its second end position by means of the detent bolts 74, 74' and the detent recesses 78, 78'. In addition, a spring-loaded detent bolt 104 in a recess of the engaging fork 54 fixes the reversing lever 46 and the engaging fork 54 to the housing 38 in the respective end position of the brush plate 10 by engaging in recesses of the housing 38 in the end positions (FIG. 2).

Figure 6:
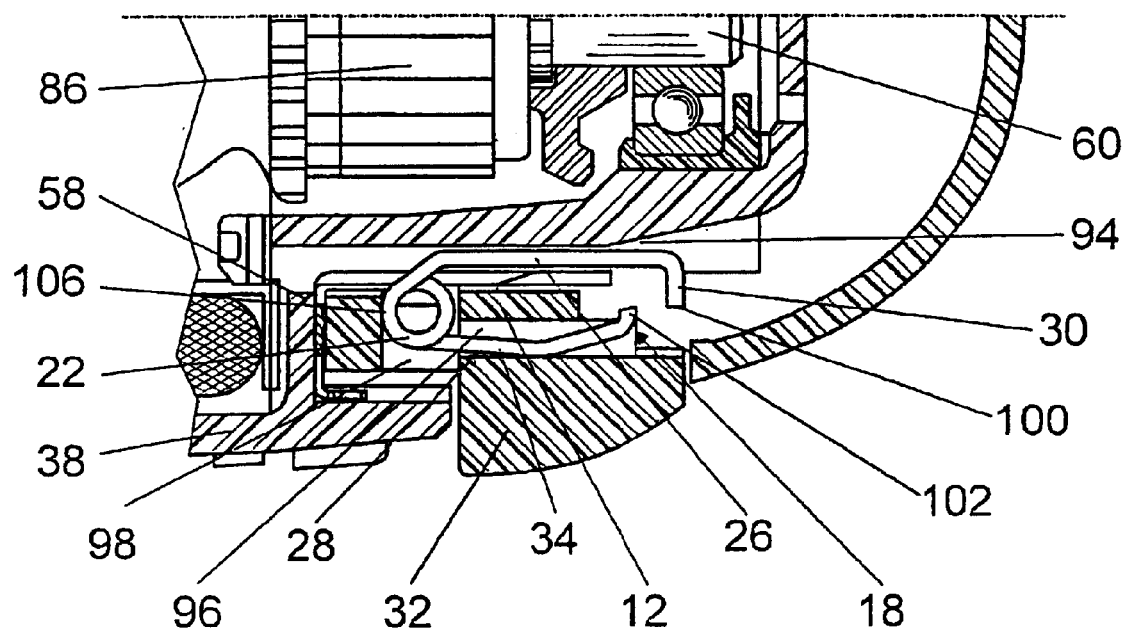
FIG. 6 shows a detail of another exemplary embodiment with an alternative holding mechanism.

FIG. 6 shows a detail of an exemplary embodiment with an alternative holding mechanism 18. In principle, components that remain essentially the same are provided with the same reference numerals. Furthermore, for features and functions that remain the same, reference can be made to the description of the exemplary embodiment in FIGS. 1 to 5. The description below is essentially restricted to the differences from the exemplary embodiment in FIGS. 1 to 5.

The holding mechanism 18 has a device 22 comprised of a leg spring, which has a bistable position and loads the brush plate 12 from a neutral, unstable position, in the circumference direction 14 toward its respective end positions. The leg spring 22 has a first leg 26 and a second leg 34, which are connected to each other by means of a coil 106 of the leg spring 22.

The leg spring 22 is supported so that it can pivot around the longitudinal axis of the first leg 26. The first leg 26 points in the direction oriented away from a tool holder 42 and engages in a longitudinal channel 94 that is formed into an outer circumference of a cup-shaped inner region of a housing 38 that is encompassed by the handle 52. At its end 100, the first leg 26 has a region that is bent radially outward, which constitutes a part 30 that prevents an incorrect installation.

At its end 102, the second leg 34 of the leg spring 22, which also points in the direction oriented away from the tool holder 42, has a region that is bent radially inward, is embodied as a detent element 28, and has a bent longitudinal axis. An actuating button 32 is formed onto a radially outer region of the brush plate 12 and protrudes outward from the housing 38. The second leg 34 engages in a longitudinal channel 96 that is formed into the radially outer region of the brush plate 12.

During installation, the second leg 34 of the leg spring 22 is inserted into the longitudinal channel 96 by means of a pocket 98 in the brush plate 12, and is elastically deformed in the process. After the end 102 of the second leg 34 has crossed the longitudinal channel 96 and when the leg spring 22 engages with its coil 106 in the pocket 98, the second leg 34 expands and the leg spring 22 is fastened to the brush plate 12 in captive fashion. The brush plate 12 can be installed in the housing 38 together with the preinstalled leg spring 22. In this case, the first leg 26 of the leg spring 22 is inserted into the open longitudinal channel 94.

In the installed position, the leg spring 22 is supported on the housing 38 with its first leg 26 in the longitudinal channel 94 and with its second leg 34, by means of the longitudinal channel 96, presses the brush plate 12 in the circumference direction 14, into its first end position.

By means of the actuating button 32 protruding from the side of the housing 38, an operator can rotate the brush plate 12 in the circumference direction 14 on a housing base 58.

The leg spring 22 is compressed by means of its legs 26, 34 until the neutral position is reached. After the neutral position is passed, the leg spring 22 expands and with its second leg 34, presses the brush plate 12 and the actuating button 32 in the circumference direction 14, into their second end position and is supported with its first leg 26 in the longitudinal channel 94 of the housing 38.

REFERENCE NUMERALS 10 brush plate
12 brush plate
14 circumference direction
16 holding mechanism
18 holding mechanism
20 device
22 device
24 leg
26 leg
28 detent element
30 part
32 actuating button
34 leg
36 detent mechanism
38 housing
40 rotation direction
42 tool holder
44 drill bit
46 reversing lever
48 actuating switch
50 handle
52 handle
54 engaging fork
56 articulating pin
58 housing base
60 armature shaft
62 end
64 longitudinal channel
66 leg
68 end
70 transverse channel
72 collar
74 detent bolt
76 detent recess
78 detent recess
80 carbon cartridge
82 carbon brush
84 spring element
86 commutator
88 stay
90 armature winding
92 frame
94 longitudinal channel
96 longitudinal channel
98 pocket
100 end
102 end
104 detent bolt
106 coil
108 coil

What is claimed is:

1. An electrical machine with a rotatable brush plate (10, 12), which is held in its end positions by means of at least one holding mechanism (16, 18) that acts in the circumference direction (14), characterized in that the holding mechanism (16, 18) has at least one device (20, 22) that loads the brush plate (10, 12) in the circumference direction (14) in said end positions, wherein said device (20, 22) is comprised of a spring element, said spring element being engaged with the brush plate (10, 12).

2. The electrical machine according to claim 1, characterized in that the device (20, 22) has a bistable position, at least in the installed position.

3. The electrical machine according to claim 2, characterized in that the device (20, 22) is comprised of a spring element.

4. The electrical machine according to claim 3, characterized in that the device (20, 22) is comprised of a leg spring.

5. A hand machine tool with an electrical machine according to claim 1.

6. An electrical machine with a rotatable brush plate (10, 12), which is held in end positions by means of at least one holding mechanism (16, 18) that acts in the circumference direction (14), characterized in that the holding mechanism (16, 18) has at least one device (20, 22) that loads the brush plate (10, 12) in the circumference direction (14), wherein said device (20, 22) has a bistabile position, at least in the installed position, wherein said device (20, 22) is comprised of a leg spring and wherein said leg spring (20, 22) is supported so that it can pivot around a first leg (24, 26).

7. The electrical machine according to claim 6, characterized in that the leg spring (22) can engage the brush plate (12) in detent fashion by means of at least one detent element (28).

8. The electrical machine according to claim 7, characterized in that the detent element (28) is of one piece with the leg spring (22).

9. The electrical machine according to claim 6, characterized in that an actuating button (32) is of one piece with the brush plate (12).

10. The electrical machine according to claim 6, characterized in that at least one detent mechanism (36) holds the brush plate (10, 12) in its end positions.

11. An electrical machine with a rotatable brush plate (10, 12) which is held in end positions by means of at least one holding mechanism (16, 18) that acts in the circumference direction (14), characterized in that the holding mechanism (16, 18) has at least one device (20, 22) that loads the brush plate (10, 12) in the circumference direction (14), wherein said device (20, 22) has a bistable position, at least in the installed position, wherein said device (20, 22) is comprised of a log spring and wherein at least one leg (26) of said leg spring (22) has a part (30) that prevents an incorrect installation.

* * * * *